United States Patent
Hutchins et al.

(10) Patent No.: US 11,724,672 B2
(45) Date of Patent: Aug. 15, 2023

(54) SYSTEM AND METHOD FOR CONTROLLING AN ELECTRONIC PARKING BRAKE

(71) Applicant: Bendix Commercial Vehicle Systems LLC, Elyria, OH (US)

(72) Inventors: Christopher H Hutchins, Bay Village, OH (US); Meviltan Mendis, Pune (IN); Ron R Stahl, Medina, OH (US); Srikiran Kosanam, Pune (IN); Girish Barade, Chandler, AZ (US)

(73) Assignee: BENDIX COMMERCIAL VEHICLE SYSTEMS LLC, Avon, OH (US)

( * ) Notice: Subject to any disclaimer, the term of this patent is extended or adjusted under 35 U.S.C. 154(b) by 385 days.

(21) Appl. No.: 16/952,655

(22) Filed: Nov. 19, 2020

(65) Prior Publication Data

US 2022/0153242 A1    May 19, 2022

(51) Int. Cl.
*B60T 7/12* (2006.01)
*B60T 8/17* (2006.01)
*B60T 7/08* (2006.01)

(52) U.S. Cl.
CPC ........ *B60T 7/12* (2013.01); *B60T 7/08* (2013.01); *B60T 8/17* (2013.01)

(58) Field of Classification Search
CPC ..... B60T 7/12; B60T 7/08; B60T 8/17; B60T 2270/406; B60T 13/662; B60T 13/683; B60T 2220/00
See application file for complete search history.

(56) References Cited

U.S. PATENT DOCUMENTS

| | | |
|---|---|---|
| 5,000,519 A | 3/1991 | Moore |
| 5,002,343 A | 3/1991 | Brearley et al. |
| 5,238,298 A | 8/1993 | Wagner et al. |
| 6,601,669 B1 | 8/2003 | Agnew |
| 7,222,691 B2 | 5/2007 | Menebroker et al. |
| 8,262,173 B2 | 9/2012 | Crawford |

(Continued)

FOREIGN PATENT DOCUMENTS

| | | | |
|---|---|---|---|
| EP | 3595914 B1 * | 3/2021 | ............... B60B 7/08 |
| JP | 2000185633 A | 7/2000 | |

(Continued)

OTHER PUBLICATIONS

English translation of Zeman WO 2018/166849 (Year: 2018).*

*Primary Examiner* — Joseph J Dallo
(74) *Attorney, Agent, or Firm* — Brian E. Kondas; Cheryl L. Greenly; Eugene E. Clair

(57) ABSTRACT

A system controlling an electronic parking brake of a vehicle includes an input device receiving an input pattern from an operator and a parking brake controller receiving the input pattern from the input device. The parking brake controller determines if the input pattern is a respective predetermined pattern for setting the electronic parking brake to one of a primary mode and a secondary mode. If the parking brake controller determines the input pattern is the predetermined pattern for setting the electronic parking brake to the secondary mode, the parking brake controller transmits an electronic control signal for releasing the electronic parking brake until a subsequent input pattern received by the input device is the predetermined pattern for setting the electronic parking brake to the primary mode.

19 Claims, 2 Drawing Sheets

(56) References Cited

U.S. PATENT DOCUMENTS

| | | |
|---|---|---|
| 9,580,045 B2 | 2/2017 | Holub et al. |
| 10,008,343 B2 | 6/2018 | Julian |
| 10,562,507 B2 | 2/2020 | Jackson et al. |

FOREIGN PATENT DOCUMENTS

| | | | | |
|---|---|---|---|---|
| JP | 2019069696 A | | 5/2019 | |
| KR | 19990049962 A | | 7/1999 | |
| KR | 2009043214 A | * | 5/2009 | |
| WO | WO-2018166849 A1 | * | 9/2018 | ............... B60B 7/08 |
| WO | WO-2019229175 A1 | * | 12/2019 | ............. B60K 28/04 |

* cited by examiner

SYSTEM AND METHOD FOR CONTROLLING AN ELECTRONIC PARKING BRAKE

BACKGROUND

The present invention relates to vehicle parking systems. It finds particular application in conjunction with an electronic parking brake apparatus and method therefor, such as for a parking system of a commercial truck, and will be described with particular reference thereto. It will be appreciated, however, that the invention is also amenable to other applications.

Vehicle parking systems for commercial trucks are known. One type of vehicle parking system for trucks is an electronic parking system (e.g., an electronic parking brake). In some electronic parking systems, the parking brake is automatically applied, for example, when the truck driver is detected as having exited the driver's seat, a vehicle door is not fully closed and/or when the truck becomes partially or fully disabled. If a driver is not in the driver's seat, a vehicle door is not fully closed, and/or the truck is disabled, the electronic parking system may apply the parking brake while limiting the use of diagnostic tools and/or interfering with servicing or towing the vehicle. Therefore, it is desirable to include special operating modes of the electronic park system to address these and other issues.

The present invention provides a new and improved apparatus and method which addresses the above-referenced problems.

SUMMARY

A system controlling an electronic parking brake of a vehicle includes an input device receiving an input pattern from an operator and a parking brake controller receiving the input pattern from the input device. The parking brake controller determines if the input pattern is a respective predetermined pattern for setting the electronic parking brake to one of a primary mode and a secondary mode. If the parking brake controller determines the input pattern is the predetermined pattern for setting the electronic parking brake to the secondary mode, the parking brake controller transmits an electronic control signal for releasing the electronic parking brake until a subsequent input pattern received by the input device is the predetermined pattern for setting the electronic parking brake to the primary mode.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
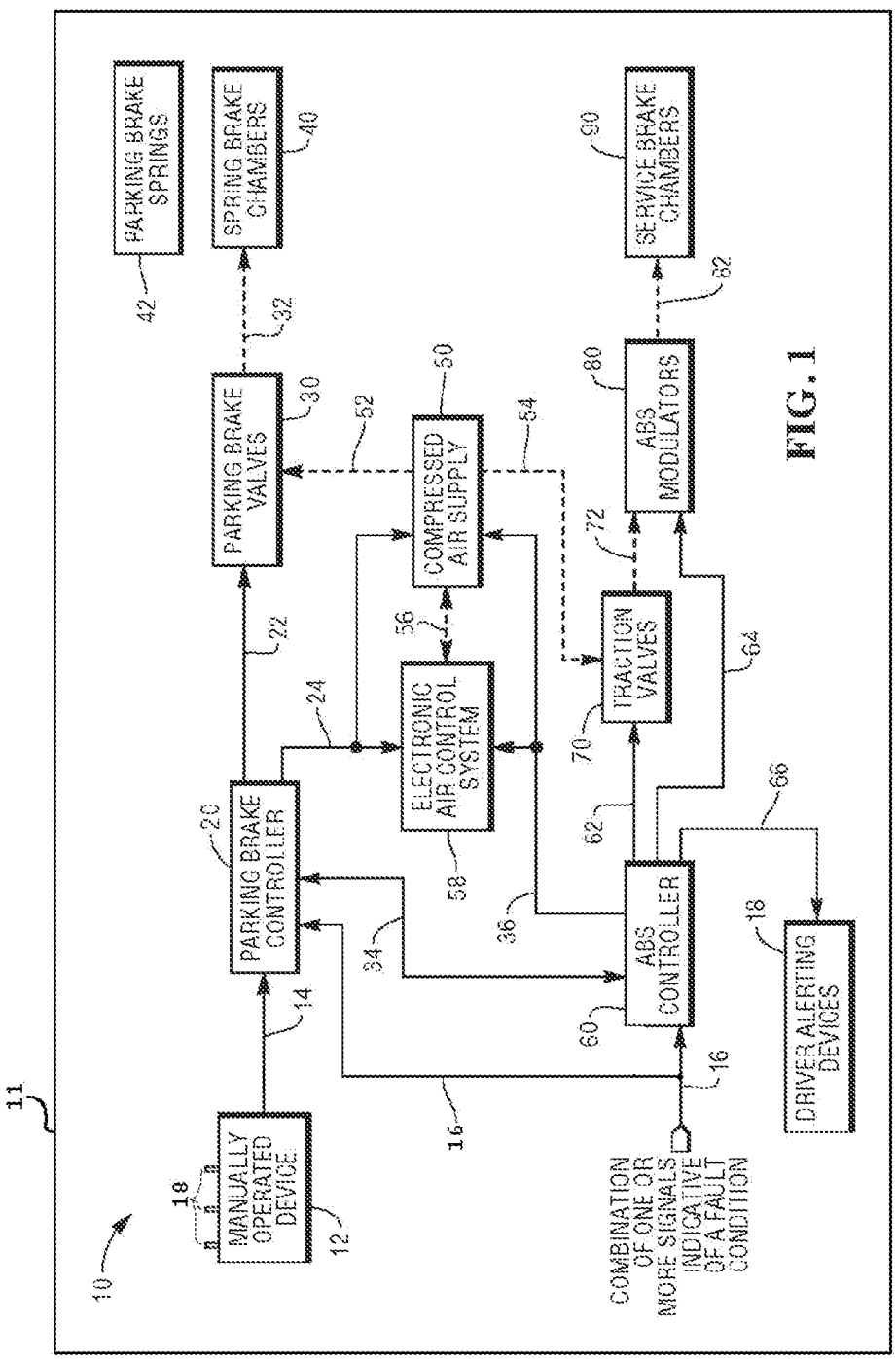
FIG. 1 illustrates a schematic block diagram showing an electronic parking apparatus constructed in accordance with an embodiment of the present invention.

With reference to FIG. 1, a simplified component diagram of an exemplary electronic parking system 10 is illustrated in accordance with one embodiment of the present invention. The electronic parking system 10 is provided for use in a heavy vehicle 11 (e.g., a truck or bus). In the illustrated embodiment, the electronic parking system 10 electrical line connections are shown as solid lines, and pneumatic lines connections are shown as dashed lines.

It is contemplated that the electronic parking system 10 operates in two (2) modes. The first mode is a primary (e.g., standard or normal) operating mode, and the second mode is a secondary (e.g., maintenance or limp-home) mode.

A device 12 (e.g., an input device) is operable by an operator (e.g., a driver) of the vehicle 11. When manually operated by the vehicle driver, the device 12 provides at least one signal on an electrical line 14 indicative of the vehicle driver's intent to set the system 10 to either the first or second mode. In one embodiment, the vehicle driver operates the device 12 to set the system 10 to the first mode so that parking brakes of the vehicle 11 may be manually and/or automatically applied (e.g., engaged) and released (e.g., disengaged). Conversely, the vehicle driver operates the device 12 to set the system 10 to the second mode so that parking brakes of the vehicle 11 are not applied (e.g., released) and remain not applied to facilitate, for example, using diagnostic tools on the vehicle 11, performing maintenance on the vehicle 11, towing the vehicle 11, servicing the vehicle 11, end-of-line testing of the vehicle 11 in, for example, an assembly plant, and/or "limp-home" operation. Also, there are times when, for example, an interlock switch malfunctions and indicates a door of the vehicle 11 is open when the door is actually fully and securely closed. Such a malfunctioning interlock switch may cause the parking brakes of the vehicle 11 to be engaged when it is actually not required. Setting the system 10 to the second mode may be desired in any of these situations.

Setting the system 10 to the second mode is contemplated when it is desirable to ensure the parking brakes of the vehicle 11 are not inadvertently applied. For example, it is desirable to ensure the parking brakes of the vehicle 11 are not inadvertently applied when using certain diagnostic tools on the vehicle 11, performing maintenance on the vehicle 11 and/or towing the vehicle 11. More specifically, it could be dangerous to a technician servicing and/or maintaining the parking brakes on the vehicle 11 if the parking brakes are applied while, for example, the technician's hands are on or near the parking brakes. Also, normal jostling of the vehicle 11 that occurs while being towed may increase the risk of the parking brakes being inadvertently applied.

The device 12 may comprise one or more switches 18 of, for example, an integrated switching module mounted on a dashboard of the vehicle 11. The device 12 may comprise any electrical, pneumatic, or electropneumatic device (e.g., the one or more switches 18) that may be operated by an operator such as the vehicle driver.

A parking brake controller 20 monitors for signals on the line 14 from the device 12 (e.g., from the one or more switches 18) indicative of the vehicle driver's intent to set the system 10 to the first mode or the second mode and, if the system 10 is in the first mode, apply or release the parking brakes of the vehicle 11. The parking brake controller 20 provides one or more control signals on an electrical line 22 to control operation of the parking brakes of the vehicle 11. More specifically, based on the signals on the line 14, the parking brake controller 20 provides signals on the line 22 to control operation of parking brake valves 30. The parking brake controller 20 also provides one or more control signals on an electrical line 34 to control operation of an anti-lock braking system (ABS) controller

60. The ABS controller 60 provides one or more control signals on an electrical line 36 to control respective operations of an electronic air control system 58 and a compressed air supply system 50.

The compressed air supply 50 provides a source of compressed air in a pneumatic line 52 to the parking brake valves 30. The parking brake valves 30 are controlled by the parking brake controller 20 to vary pneumatic pressure in a pneumatic line 32 to one or more chambers of spring brake chambers 40.

When the driver intends to set the system 10 to the first mode or the second mode, the driver operates the device 12 in a predefined manner for setting the system 10 to the first mode. For example, the driver operates the one or more switches 18 of the device 12 in a predetermined pattern to set the system 10 to the first mode. In one embodiment, the predetermined pattern is moving a single switch 18 to a first position to set the system 10 to the first mode. In this embodiment, it is contemplated that the switch 18 may be a two-position switch, a three-position switch or a switch with another number of multiple positions. For example, if the switch 18 is a two-position switch, the predefined pattern may involve the driver moving the switch 18 between a first position, which sets the system 10 to the first mode, and a second position, which sets the system 10 to the second mode. It is also contemplated in another embodiment that the predetermined pattern involves moving the switch 18 back and forth between the first and second positions within a predetermined time before finally setting the switch 18 to the first position to set the system 10 to the first mode, or to the second position to set the system 10 to the second mode. In another embodiment the switch 18 is a three-position switch that, for example, includes a "neutral" position between the first and second positions. In this embodiment, the predetermined pattern involves moving the switch 18 between the three-positions to select the first or second mode. In yet other embodiments, multiple switches 18 that include multiple positions are used along with predetermined pattern(s) for setting the system 10 to the first mode or the second mode.

As discussed above, the driver sets the system 10 to the first mode when the vehicle driver intends for the parking brakes of the vehicle 11 to be manually and/or automatically applied and released.

When the vehicle driver desires to manually apply parking brakes of the vehicle 11, the driver operates the device 12 (e.g., the switch(es) 18) of the device 12) according to a first predefine pattern to set the system 10 to the first mode. Once the system 10 is set to the first mode, the driver operates the device 12 (e.g., the switch(es) 18 of the device 12) according to i) an apply predefined pattern to apply the vehicle parking brakes, or ii) a release predefined pattern to release the vehicle parking brakes.

If the system 10 is in the first mode and the driver operates the switch(es) 18 according to the apply predefined pattern to apply the vehicle parking brakes, the parking brake controller 20 provides signals on the line 22 in response to receiving the signal on the line 14 indicative of the driver's intent to apply parking brakes of the vehicle. Signals on the line 22 are applied to the parking brake valves 30 so as to exhaust air in one or more chambers of spring brake chambers 40 which are operatively coupled in known manner to parking brake springs 42. When air in spring brake chambers 40 is exhausted and/or system air pressure drops to less than about 45 psi to 60 psi, the parking brake springs 42 are automatically applied without any human intervention to apply the vehicle parking brakes, as is known. Structure and operation of the parking brake controller 20 and parking brake valves 30 for controlling operation of the spring brake chambers 40 and parking brake springs 42 to park the vehicle 11 are conventional and, therefore, will not be further described.

The parking brake controller 20 also applies one or more signals on an electrical line 24 to the electronic air control system 58 which is connected via a pneumatic line 56 to the compressed air supply 50. The parking brake controller 20 provides one or more signals on the line 24 to control a governing device (not shown) for the compressed air supply 50 and/or the electronic air control system 58 so that system air pressure does not rebuild until after a fault condition of the vehicle and any diagnostic trouble codes are corrected. Structure and operation of electronic air control systems and compressed air supplies are known and, therefore, will not be described.

The ABS controller 60 communicates with the parking brake controller 20 via the electrical line 34. The ABS controller 60 can also be used in traction or stability control systems. The ABS controller 60 applies one or more signals on an electrical line 62 to control operation of service brakes of the vehicle 11. More specifically, the ABS controller 60 provides signals on the line 62 to control operation of traction valves 70 and signals on an electrical line 64 to control operation of ABS modulators 80 in response to one or more signals from wheel speed sensors (not shown), as is known.

The ABS controller 60 also applies one or more signals on the electrical line 36 to electronic air control system 58 and/or to a governing device (not shown) for the compressed air supply 50. Compressed air supply 50 provides a source of compressed air in a pneumatic line 54 to the traction valves 70. The traction valves 70 are controlled by the ABS controller 60 to vary pneumatic pressure in a pneumatic line 72 to the one or more ABS modulators 80. The ABS controller 60 also applies one or more signals on the line 64 to the ABS modulators 80.

In response to one or more signals on the line 72 and one or more signals on the line 64, the ABS modulators 80 are controlled by the ABS controller 60 to vary pneumatic pressure in a pneumatic line 82 to one or more chambers of service brake chambers 90. The service brake chambers 90 and the spring brake chambers 40 may comprise an all-in-one brake actuator. As an example, the brake actuator may comprise EverSure™ spring brake available from Bendix Spicer Foundation Brake LLC located in Elyria, Ohio. The ABS controller 60, the traction valves 70, and the ABS modulators 80 comprise part of a conventional ABS system, as is known. The structure and operation of ABS systems to control service brakes are known and, therefore, will not be described.

In accordance with one embodiment, the ABS controller 60 receives a signal on the line 34 from the parking brake controller 20. In one embodiment, the signal on the line 34 from the parking brake controller 20 is indicative of the vehicle driver's intent to set the system 10 to the first mode or the second mode. If the system 10 is already set to the first mode, the ABS controller 60 receives a signal on the line 34 from the parking brake controller 20 indicative of the vehicle driver's intent to apply or release the parking brakes of the vehicle 11.

The ABS controller 60 and the parking brake controller 20 also receive a combination of one or more signals from an electrical line 16. The combination of one or more signals from the line 16 is indicative of a fault condition of the vehicle. Examples of fault conditions include loss of electrical communication with parking brake valves 30, a short or open circuit anywhere in the parking control circuit, and loss of activation means to parking brake valves 30 such that the valves stop working. Of course, the fault conditions noted here are merely examples, and other fault conditions are possible.

If the predetermined pattern the driver inputs sets the system 10 to the second mode, the parking brake controller 20 transmits signal(s) to the parking brake valves 30 to cause pneumatic pressure in the pneumatic line 32 to be maintained in the one or more chambers of spring brake chambers 40. Maintaining pneumatic pressure in the line 32 and the one or more chambers of spring brake chambers 40 causes the parking brakes to be disengaged (e.g., released) and be maintained as disengaged. In one embodiment, the system 10 remains in the second mode until an operator manually inputs a predetermined pattern via the device 12 to indicate an operator's intent to set the system 10 to the first mode.

As discussed above, the ABS controller 60 also receives a combination of one or more signals from the line 34. In one embodiment, the combination of one or more signals from the line 34 is indicative of a manually input command to place the system 10 into a secondary operating mode (e.g., a maintenance operating mode). While in the secondary operating mode, the system 10 sets the parking brakes of the vehicle 11 to be disengaged. In one embodiment, the parking brakes of the vehicle 11 remain disengaged until the parking brake controller 20 receives a subsequent predetermined pattern the operator inputs to set the system 10 to the first mode.

Figure 2:
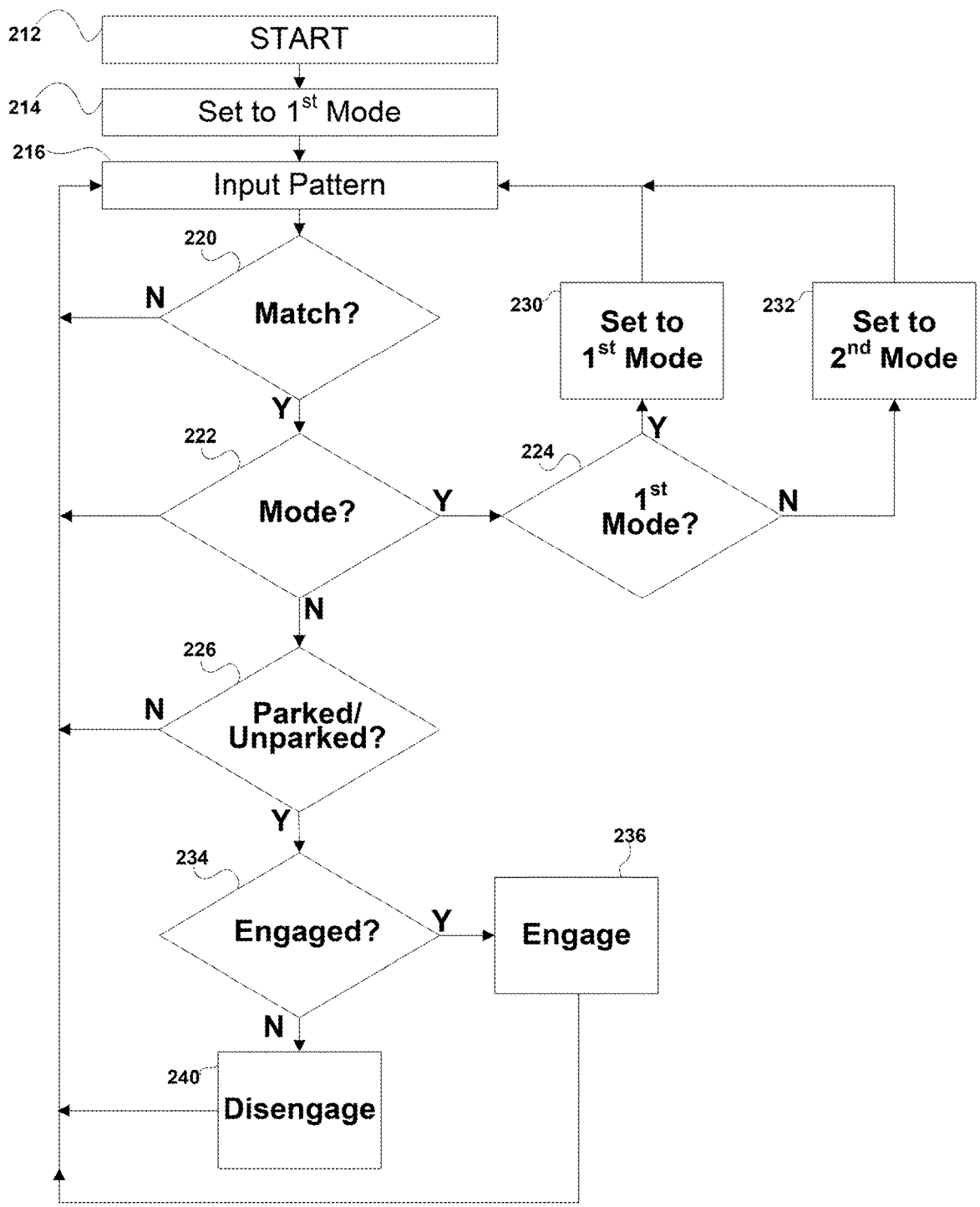
FIG. 2 is an exemplary methodology of controlling the electronic parking apparatus in accordance with one embodiment illustrating principles of the present invention.

With reference to FIG. 2, an exemplary methodology of the system shown in FIG. 1 for setting the system between the first and second modes is illustrated. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

With reference to FIGS. 1 and 2, the method starts in a step 212. Then, in a step 214, the system 10 is initially set to the first (e.g., normal) mode. In a step 216, the operator operates the one or more switches 18 of the device 12 to input a pattern. In a step 220, a determination is made whether the pattern input in the step 216 matches any of the predetermined patterns for setting the mode of the system 10 or engaging/disengaging the parking brakes of the vehicle 11. If it is determined in the step 220 that the pattern does not match any of the predetermined patterns for setting the mode of the system 10 or engaging/disengaging the parking brakes of the vehicle 11, control returns to the step 216. If, on the other hand, it is determined in the step 220 that the pattern does match one of the predetermined patterns for setting the mode of the system 10 or engaging/disengaging the parking brakes of the vehicle 11, control passes to a step 222.

In the step 222, a determination is made whether the pattern input in the step 216 matches either the predetermined pattern to set the mode of the system 10 to the first (e.g., normal) mode or the second (e.g., maintenance) mode. If it is determined in the step 222 that the pattern input in the step 216 matches the predetermined pattern to set the system 10 to either the first or second mode, control passes to a step 224. Otherwise, control passes to a step 226.

In the step 224 a determination is made whether the pattern input in the step 216 matches the predetermined pattern to set the mode of the system 10 to the first (e.g., normal) mode. If it is determined in the step 224 that the pattern input in the step 216 matches the predetermined pattern to set the mode of the system 10 to the first (e.g., normal) mode, control passes to a step 230 to set the mode of the system 10 to the first (e.g., normal) mode. Control then returns to the step 216 to await another input from the operator. Otherwise, if it is determined in the step 224 that the pattern input in the step 216 does not match the predetermined pattern to set the mode of the system 10 to the first (e.g., normal) mode, it is assumed the pattern input in the step 216 matches the predetermined pattern to set the mode of the system 10 to the second (e.g., maintenance) mode. Therefore, if it is determined in the step 224 that the pattern input in the step 216 does not match the predetermined pattern to set the mode of the system 10 to the first (e.g., normal) mode, control passes to a step 232 to set the mode of the system 10 to the second (e.g., maintenance) mode before returning to the step 216 to await another input from the operator.

As noted above if it is determined in the step 222 that that the pattern input in the step 216 does not match the predetermined pattern to set the system 10 to either the first or second mode, control passes to the step 226. In the step 226, a determination is made whether the pattern input in the step 216 matches either the predetermined pattern to set the parking brake of the vehicle 11 to be either engaged (e.g., parked) or disengaged (e.g., unparked). If it is determined in the step 226 that the pattern input in the step 216 does not match either the predetermined pattern to set the parking brake of the vehicle 11 to be either engaged (e.g., parked) or disengaged (e.g., unparked), control returns to the step 216 to await another input from the operator. Otherwise, control passes to a step 234.

In the step 234, a determination is made whether the pattern input in the step 216 matches the predetermined pattern to set the parking brakes to be engaged. If it is determined in the step 234 that the pattern input in the step 216 matches the predetermined pattern to set the parking brakes to be engaged, control passes to a step 236 to engage the parking brakes. Then, control returns to the step 216 to await another input from the operator.

Otherwise, if it is determined in the step 234 that the pattern input in the step 216 does not match the predetermined pattern to set the parking brakes to be engaged, control passes to a step 240 to disengage the parking brakes. Then, control returns to the step 216 to await another input from the operator.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A system controlling an electronic parking brake of a vehicle, the system comprising:
   an input device receiving an input pattern from an operator;
   a parking brake controller receiving the input pattern from the input device, the parking brake controller determining when the input pattern is a respective predetermined pattern for setting the electronic parking brake to one of a primary mode and a secondary mode, and
   when the parking brake controller determines the input pattern is the predetermined pattern for setting the electronic parking brake to the secondary mode, transmitting an electronic control signal for releasing the electronic parking brake until a subsequent input pattern received by the input device is the predetermined pattern for setting the electronic parking brake to the primary mode.

2. The system controlling an electronic parking brake of a vehicle as set forth in claim 1, wherein:
   the input device includes a switch moved between positions to create the input pattern.

3. The system controlling an electronic parking brake of a vehicle as set forth in claim 1, wherein:
   the parking brake controller determines when the input pattern is a respective predetermined pattern for setting the electronic parking brake to one of a parked position and an unparked position.

4. The system controlling an electronic parking brake of a vehicle as set forth in claim 3, wherein:
   when the electronic parking brake is in the primary mode, the parking brake controller transmits a parking brake signal for setting the electronic parking brake to one of the parked position and the unparked position.

5. The system controlling an electronic parking brake of a vehicle as set forth in claim 4, wherein:
   when the electronic parking brake is in the secondary mode, the parking brake controller does not transmit the parking brake signal for setting the electronic parking brake to one of the parked position and the unparked position.

6. The system controlling an electronic parking brake of a vehicle as set forth in claim 1, further including:
   a service brake controller receiving the input pattern from the input device, the service brake controller determining when the input pattern is a respective predetermined pattern for setting the electronic parking brake to one of a primary mode and a secondary mode, and
   when the service brake controller determines the input pattern is the predetermined pattern for setting the electronic parking brake to the secondary mode, transmitting an electronic control signal for releasing the electronic parking brake until a subsequent input pattern received by the input device is the predetermined pattern for setting the electronic parking brake to the primary mode.

7. The system controlling an electronic parking brake of a vehicle as set forth in claim 6, wherein:
   when the electronic parking brake is in the primary mode, the service brake controller transmits a service brake signal for setting the electronic parking brake to one of the parked position and the unparked position.

8. The system controlling an electronic parking brake of a vehicle as set forth in claim 6, wherein:
   when the electronic parking brake is in the secondary mode, the service brake controller does not transmit the service brake signal for setting the electronic parking brake to one of the parked position and the unparked position.

9. A method for controlling an electronic parking brake of a vehicle, the method comprising:
   receiving an input pattern from an operator;
   determining when the input pattern is a respective predetermined pattern for setting the electronic parking brake to one of a primary mode and a secondary mode, and
   when the input pattern is the predetermined pattern for setting the electronic parking brake to the secondary mode, transmitting an electronic control signal for releasing the electronic parking brake until a subsequent input pattern received by the input device is the predetermined pattern for setting the electronic parking brake to the primary mode.

10. The method for controlling an electronic parking brake of a vehicle as set forth in claim 9, further including:
    moving a switch between positions to create the input pattern.

11. The method for controlling an electronic parking brake of a vehicle as set forth in claim 9, further including:
    determining when the input pattern is a respective predetermined pattern for setting the electronic parking brake to one of a parked position and an unparked position.

12. The method for controlling an electronic parking brake of a vehicle as set forth in claim 11, further including:
    when the electronic parking brake is in the primary mode, transmitting a parking brake signal for setting the electronic parking brake to one of the parked position and the unparked position.

13. The method for controlling an electronic parking brake of a vehicle as set forth in claim 12, further including:
    when the electronic parking brake is in the secondary mode, not transmitting the parking brake signal for setting the electronic parking brake to one of the parked position and the unparked position.

14. The method for controlling an electronic parking brake of a vehicle as set forth in claim 9, further including:
    receiving the input pattern from the input device at a parking brake controller; and
    when the parking brake controller determines the input pattern is the predetermined pattern for setting the electronic parking brake to the secondary mode, transmitting an electronic control signal for releasing the electronic parking brake until a subsequent input pattern received by the input device is the predetermined pattern for setting the electronic parking brake to the primary mode.

15. The method for controlling an electronic parking brake of a vehicle as set forth in claim 9, further including:
    receiving the input pattern from the input device at a service brake controller; and
    when the service brake controller determines the input pattern is the predetermined pattern for setting the electronic parking brake to the secondary mode, transmitting an electronic control signal for releasing the electronic parking brake until a subsequent input pattern received by the input device is the predetermined pattern for setting the electronic parking brake to the primary mode.

16. The method for controlling an electronic parking brake of a vehicle as set forth in claim 5, wherein:
    when the electronic parking brake is in the secondary mode, the electronic parking brake remains in the unparked position despite a malfunctioning interlock switch that would cause the electronic parking brakes to be engaged while the electronic parking brake is in the primary mode.

17. The method for controlling an electronic parking brake of a vehicle as set forth in claim 16, wherein:
when the electronic parking brake is in the secondary mode, the electronic parking brake remains in the unparked position to operate the vehicle in a limp-home mode.

18. The method for controlling an electronic parking brake of a vehicle as set forth in claim 13, further including:
when the electronic parking brake is in the secondary mode, maintaining the electronic parking brake in the unparked position despite a malfunctioning interlock switch that would cause the electronic parking brakes to be engaged while the electronic parking brake is in the primary mode.

19. The method for controlling an electronic parking brake of a vehicle as set forth in claim 18, further including:
when the electronic parking brake is in the secondary mode, maintaining the electronic parking brake in the unparked position to operate the vehicle in a limp-home mode.

\* \* \* \* \*